(12) United States Patent
Dakhil

(10) Patent No.: US 6,799,265 B1
(45) Date of Patent: Sep. 28, 2004

(54) DEPENDENCY CHECKING FOR RECONFIGURABLE LOGIC

(75) Inventor: Dani Y. Dakhil, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 09/613,498

(22) Filed: Jul. 11, 2000

(51) Int. Cl.[7] ............................................. G06F 12/16
(52) U.S. Cl. .................. 712/217; 712/216; 712/210; 712/225; 713/100
(58) Field of Search .................... 712/15, 217, 224, 712/225, 210, 216; 711/210, 163, 152, 103; 708/232; 713/100; 326/37, 38, 39

(56) References Cited

U.S. PATENT DOCUMENTS

| | | | | |
|---|---|---|---|---|
| 5,592,641 A | * | 1/1997 | Fandrich et al. ............ 711/103 |
| 5,603,043 A | * | 2/1997 | Taylor et al. .................. 712/1 |
| 5,652,875 A | * | 7/1997 | Taylor ............................ 716/1 |
| 5,713,006 A | * | 1/1998 | Shigeeda ..................... 711/170 |
| 5,784,577 A | * | 7/1998 | Jacobson et al. ........... 710/104 |
| 6,373,770 B1 | * | 4/2002 | Kwon ..................... 365/225.7 |
| 6,591,357 B2 | * | 7/2003 | Mirsky ........................ 712/18 |

* cited by examiner

*Primary Examiner*—William M. Treat
(74) *Attorney, Agent, or Firm*—Michael A. Proksch

(57) ABSTRACT

A data dependency checking table is used with a reconfigurable chip. A control processing chip on the reconfigurable chip can load variable size blocks of data to and from reconfigurable slices on the reconfigurable chip from an external memory. The dependency checking table is used to ensure data coherency. The dependency checking table stores an indication of size of the memory blocks transferred between the external memory and the reconfigurable logic slices. In a preferred embodiment, the size indication is a mask value in which reduces the computation involved in determining whether there is a potential data coherency conflict.

26 Claims, 11 Drawing Sheets

| Field | Bits | Description |
|---|---|---|
| SRC1ADR | 25 | Source address |
| SRC1MSK | 10 | Source mask |
| SRC1VLD | 1 | Source 1 address valid |
| SRC2ADR | 25 | Source address |
| SRC2MSK | 10 | Source mask |
| SRC2VLD | 1 | Source 2 address valid |
| DSTADR | 25 | Destination address |
| DSTMSK | 10 | Destination mask |
| DSTVLD | 1 | Destination address valid |

FIG. 8

| Mask (before left shifting by SZMULT) | Value in R[6:0] | Address Bits to be compared |
|---|---|---|
| 1110000000 | 0000000 | 31 30 29 28 ..... 20 19 18 17 16 15 14 13 12 11 10 9 8 7 |
| 1111111111 | 0000001 | |
| 1111111110 | 000001x | |
| 1111111100 | 00001xx | |
| 1111111000 | 0001xxx | |
| 1111110000 | 001xxxx | |
| 1111100000 | 01xxxxx | |
| 1111000000 | 1xxxxxx | |

Legend:
- Value in multiplier field SZMUL = 00 (multiply by 2^0)
- Value in multiplier field SZMUL = 01 (multiply by 2^1)
- Value in multiplier field SZMUL = 10 (multiply by 2^2)
- Value in multiplier field SZMUL = 11 (multiply by 2^3)

FIG. 9

| Field | Bits | Description | Reset | Type |
|---|---|---|---|---|
| RESERVED | 31:6 | Reserved, Read as 0 | 0 | R |
| DCTVLD | 5:2 | DCT valid. Bits in this field indicate which DCT entry is valid:<br>xxx1 : Entry 0 is valid<br>xx1x : Entry 1 is valid<br>x1xx : Entry 2 is valid<br>1xxx : Entry 3 is valid | 0 | R |
| SBEN | 1 | CPU Streaming Buffer Enable. When set, the CPU stream buffer is enabled. Turning off this bit causes the stream buffer to flush if and only if it is dirty. | 0 | RW |
| DCTEN | 0 | DCT Enable. When set, the DCT is enabled. Software must not turn the DCT off until all bits in field DCTVLD are clear. | 0 | RW |

FIG. 10

| | t | t+1 | t+2 | t+3 | t+4 | t+5 | t+6 | t+7 | t+8 |
|---|---|---|---|---|---|---|---|---|---|
| mov r5, r7 | ifetch | r7 | mov r5,r4 | r5 | | | | | |
| xfb.2 r5,r4,4,4 | | ifetch | r5,r4 | xfb | dct | | | | |
| ld r20,[r4] | | | ifetch | r4 | acalc | dct | | | |
| xfb.2 r7,r8,4,4 | | | | ifetch | r7,r8 | xfb | dct | | |
| xfb.2 r8,r9,4,4 | | | | | ifetch | r8,r9 | xfb | dct | |
| xfb.2 r1,r2,8,8 | | | | | | ifetch | r1,r2 | Stall | stall |
| xfb_hazard | L | L | L | L | L | L | L | | |
| ld_st_hazard | L | L | L | L | L | | | | |
| xfb_first | H | H | H | H | H | | | | L |

FIG. 11

DEPENDENCY CHECKING FOR RECONFIGURABLE LOGIC

BACKGROUND OF THE INVENTION

1. Field of the Invention

The present invention relates to reconfigurable computing systems.

2. State of the Art

As the cost of complex integrated circuits continues to fall, systems companies are increasingly embedding RISC processors into non-computer systems. As a result, whereas the bulk of development work used to be in hardware design, now it is in software design. Today, whole applications, such as modems, digital video decompression, and digital telephony, can be done in software if a sufficiently high-performance processor is used. Software development offers greater flexibility and faster time-to-market, helping to offset the decrease in life cycle of today's electronic products. Unfortunately, software is much slower than hardware, and as a result requires very expensive, high-end processors to meet the computational requirements of some of these applications. Field Programmable Gate Arrays (FPGAs) are also being increasingly used because they offer greater flexibility and shorter development cycles than traditional Application Specific Integrated Circuits (ASICs), while providing most of the performance advantages of a dedicated hardware solution. For this reason, companies providing field programmable or embedded processor solutions have been growing very rapidly.

It has long been known in the software industry that typically most of the computation time of any application is spent in a small section of code. A general trend in the industry has been to build software applications, standardize the interfaces to these computationally intensive sections of code, and eventually turn them into dedicated hardware. This approach is being used by many companies to provide chips that do everything from video graphics acceleration to MPEG digital video decompression. The problem with this approach is that dedicated chips generally take one or more years to create and then are good only for their specific tasks. As a result, companies have begun providing complex digital signal processing chips, or DSPs, which can be programmed to perform some of these tasks. DSPs are more flexible than application-specific hardware, but are less flexible than standard processors for purposes of writing software.

The logical extension of the foregoing trends is to create a chip which is a processor with dedicated hardware that replaces the computationally intensive sections of the application code. In fact, most complex MPEG chips already include a dedicated embedded processor, but are nevertheless not very flexible. Unfortunately, FPGAs, while they provide greater flexibility, are only 5–10% as dense as ASICs (gate arrays/standard cells) per usable function. Since there are usually many different sections of computationally intensive code that must be executed at different times within any given application, a more efficient way of using the inherently inefficient FPGA logic is to repeatedly load each specific hardware logic function as it is needed, and then replace it with the next function. This technique is referred to as reconfigurable computing, and is being pursued by university researchers as well as FPGA companies such as Xilinx and others. U.S. Pat. No. 5,652,875 describes a "selected instruction set" computer (SISC) CPU implemented in programmable hardware. A related patent is U.S. Pat. No. 5,603,043. Both of these patents are incorporated herein by reference.

It is desired to have an improved method and apparatus for reconfigurable computing.

SUMMARY OF THE PRESENT INVENTION

A problem that can occur in reconfigurable computing systems that use more than one reconfigurable region concerns data coherency. In one reconfigurable computing system, multiple reconfigurable slices are used. Data from an external memory is written to and stored from these reconfigurable slices. A central processing unit is used to implement instructions which result in the loading of these reconfigurable slices to and from the external memory. The problem of data coherency can occur when these instructions operate out of order. Consider an example when a first data slice is loaded with an instruction which loads data blocks A and B from the external memory and intends to write the result in data block C. A later instruction loads data blocks C and D from the external memory and intends to write the result in data block E. If the second instruction starts before the first instruction begins, the old value of data block C would be used by the second instruction rather than the updated version.

In order to maintain the data coherency and in-order operation, the present invention uses a data dependency checking table which checks to ensure that the instructions do not operate out of order. For example the data dependency checking table can have an entry which stores the information concerning the data blocks A, B and C in one data entry. When another instruction loading data blocks C and D into a reconfigurable slice and intending to write the results of a computation into block E is about to occur, the dependency checking table can detect the data dependency and the conflict is avoided. Note in this example, the second instruction would be stalled by the dependency checking table until the first instruction completes.

The data blocks loaded into and out of the different reconfigurable slices vary in size. For this reason, an indication of the size of the data blocks is stored in the dependency data table. In a preferred embodiment, a mask value is stored in the data dependency checking table so that the protected regions of the external memory can be quickly computed. The masks are used to produce masked addresses that can be compared in a simple identity comparison rather than in a computationally complex function of the different addresses and the exact data block sizes.

In a preferred embodiment of the present invention, the dependency checking table works with extension instructions. The extension instructions include configuration extension instructions to load a configuration into the reconfigurable slices, and data block extension instructions that indicate the data blocks to be sent to and stored from the slices in and out of the external memory. Each of the data block extension instructions results in an entry being placed into the dependency checking table. When such a data block extension instruction finishes the dependency checking table entry is cleared.

Another embodiment of the present invention concerns the use of a dependency checking table in a system in which the data dependency table stores a mask value which is used to give an indication of the size of the data blocks involved. The mask values can be used in a relatively quick computation to determine whether there is a conflict between data accesses to the external memory.

BRIEF DESCRIPTION OF THE DRAWINGS

FIG. 8 is a table that illustrates one embodiment of the data fields for the one entry of a dependency checking table.

FIG. 9 is a table that illustrates the operation of one embodiment of the conversion of the size data into a mask value for storing in the dependency checking table.

FIG. 10 is a table that illustrates one embodiment of a register that can be used along with the dependency checking table of the present invention.

FIG. 11 is a simplified diagram illustrating the operation of one embodiment of the dependency checking table of the present invention.

DETAILED DESCRIPTION OF THE PREFERRED EMBODIMENT

Figure 1:
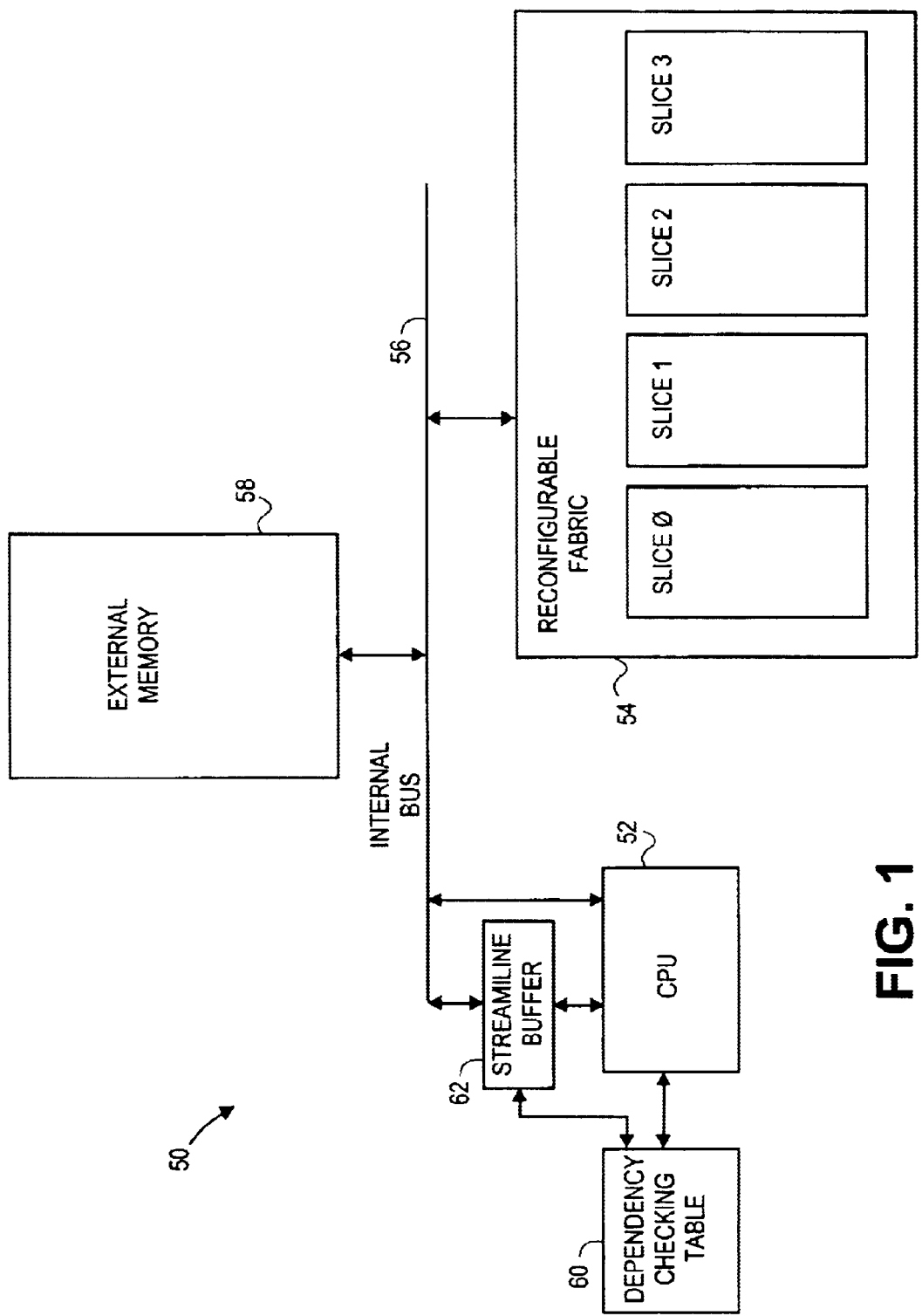
FIG. 1 is a diagram that shows a CPU, reconfigurable logic, external memory, and a data dependency checking table used with the present invention.

FIG. 1 is a diagram that illustrates the system 50 of the present invention. The system 50 includes a reconfigurable chip that includes a CPU 52 and a reconfigurable logic 54 interconnected by an internal bus 56. Additional elements such as direct memory access (DMA) units, not shown, are also used. The chip is connected to an external memory 58. In order to use the chip for reconfigurable computing, configuration data from the external memory 58 is loaded into the reconfigurable logic 54. This sets up the reconfigurable logic to do a predetermined computation. Details of one embodiment of reconfigurable logic using slices is described in the patent application Ser. No. 08/884,380, filed Jun. 27, 1997, which is incorporated herein by reference.

Blocks of data can be loaded into the reconfigurable slices to be operated upon by the reconfigurable logic. The results of these computations can be loaded back into the external memory 58. By operating on relatively large blocks of data in the reconfigurable slices, the computations can be speed up. In one embodiment, the loading of configuration data and the operating on data blocks can be done by instructions called extension instructions. The CPU 52 can interpret these extension instructions to cause the data to be loaded from the external memory 58 and from the reconfigurable logic 54. In a preferred embodiment, this is done using a direct memory access (DMA) unit not shown.

Because there is more than one reconfigurable slice, data coherency problems may occur. Consider the code sequence below:

<instruction>
<instruction>
Function foo; Reads block A. executes on slice 0.
<instruction>
<instruction>
Function bar; Modifies block A. executes on slice 1.
<instruction>

Functions foo and bar are extension instructions. These functions are loaded into different slices. Unless controls are put on the system, the functions foo and bar may complete out of order. That is the function bar may complete before the function foo. In that case, the function foo may incorrectly use the modified value for block A. In the preferred embodiment of the present invention, a number of data coherency issues are detected. The situation described above is the reverse dependency situation where function bar modifies block A before function foo reads block A. A true dependency situation can occur if function foo modifies block A and function bar reads block A. In this situation, the function foo may not complete before function bar begins, and thus the incorrect value of block A is used by function bar. In an output dependency situation, both function foo and function bar modify block A. In this case, function foo could modify block A after function bar causing an incorrect value for the block A. As will be described below, this situation is somewhat complicated since the extension instructions may have multiple source addresses as well as a destination address each of which have to be detected for dependencies. In the present invention, this detection is done using the dependency checking table.

To a certain extent, dependency checking can be done in software. However, only static data dependencies can be detected in software. Sometimes the addresses for the different data blocks are generated during run-time. For that reason, when the software code is examined, those data dependencies cannot be detected. By using the data dependency checking table, the present invention allows run-time data dependency situations to be detected. Looking again at FIG. 1, the dependency checking table 60 is used to store information concerning the data block extension instructions. This dependency checking table can be used to examine additional data block extension instructions to determine whether these instructions should be stalled in order to force in-order execution when there is a data dependency situation. In one embodiment, the dependency checking table 60 has one entry for each of the data slices. When a data block extension instruction is loaded into the data slice, the addresses and a mask produced from an indication of the size of the data blocks are stored in the dependency checking table. The use of mask value allows for flexibility in the size of the protected regions in the external memory. The use of mask also decreases the computational time for the dependency checking.

FIG. 1 also shows a situation where the dependency checking table includes a entry for the streaming buffer 62, a data cache. In a preferred embodiment, the dependency checking table 60 examines the addresses of the direct memory access instructions passed to the slice and the load and store instructions passed to the load/store unit of the central processing unit 52. This system can also be used to support the software locking of specific regions of memory. The streaming buffer 62 stores a block of data from memory whenever a load from the external memory is done. A problem could occur if block A is loaded into the streaming buffer and a later function reads and modifies block A. Consider the following sequence.

LD X, r0; Streaming buffer miss; block A loaded into streaming buffer.

<instruction>

Function foo; Modifies block A. executes on slice 0.

<instruction>

<instruction>; Slice 0 completes function foo, and lock is removed from DCT.

<instruction>

LD X, r5; streaming buffer miss; old block A loaded into streaming buffer

The above data sequence shows that the data cache needs to be invalidated when the slices store data blocks into the external memory or when a data block is locked using the dependency checking table which overlaps with the data stored into data cache.

Figure 2:
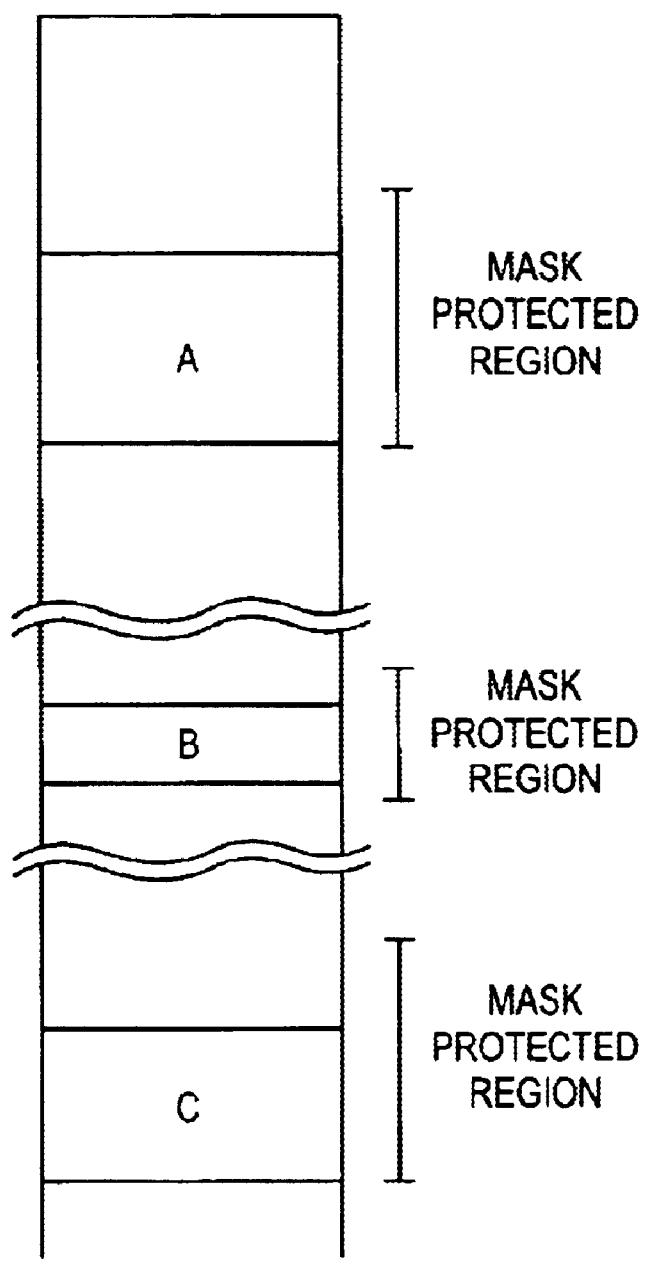
FIG. 2 is a diagram of an external memory for use with the present invention.

FIG. 2 is a diagram that illustrates the use of the mask values to protect the regions in the external memory. The data blocks A, B, and C can be of different size. This is different from most CPU data as shown in FIG. 2 checking methods which detect data dependencies for fixed sized data blocks for a specified range at fixed length contents. The mask protection regions in a preferred embodiment can be various sizes.

Figure 3:
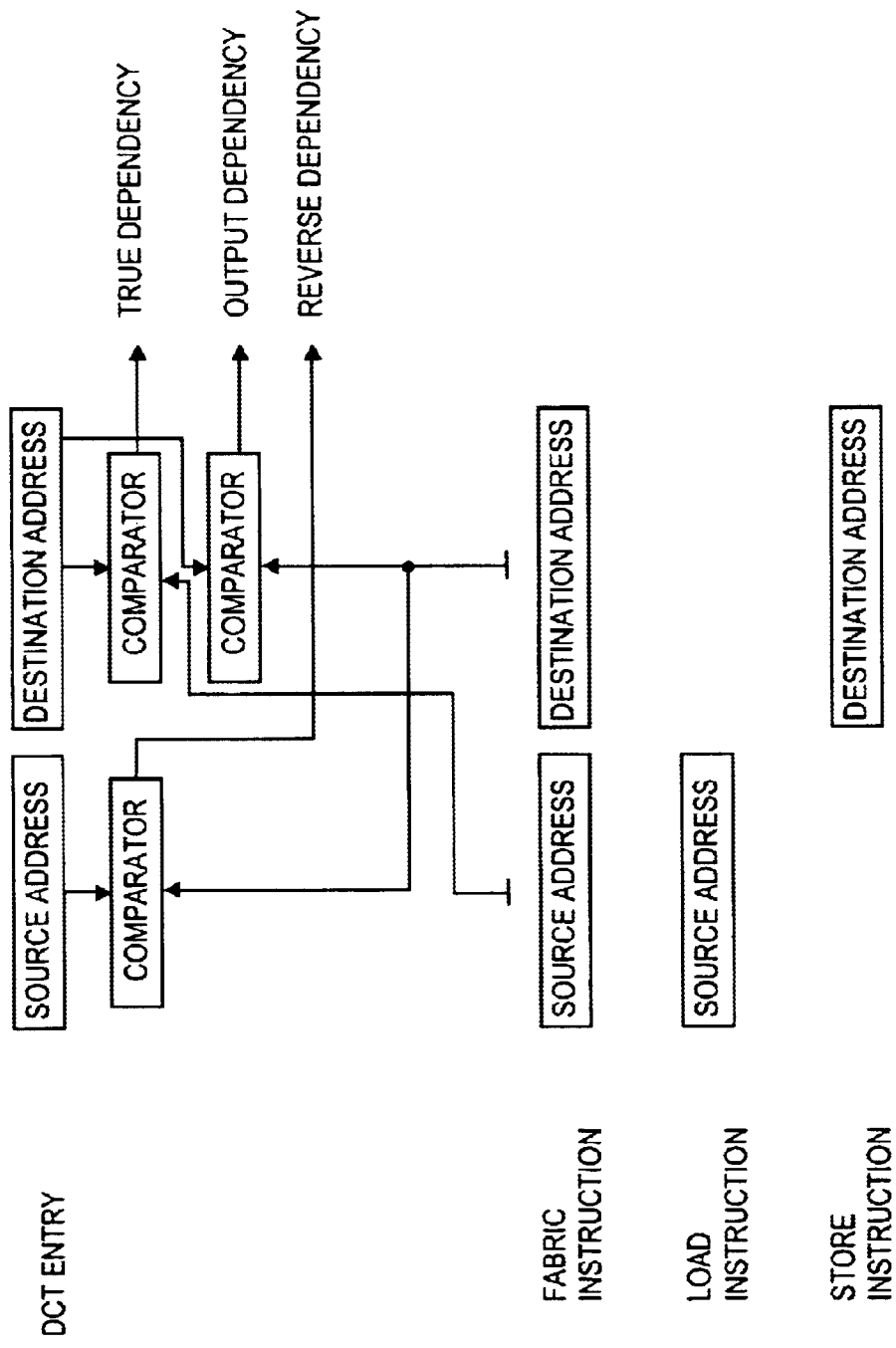
FIG. 3 is a diagram that shows the data dependency checking scheme of one embodiment of the present invention.

FIG. 3 is a diagram that illustrates the dependency checking table comparison for a single dependency checking table entry. For a fabric instruction (data block extension instruction) each source address is compared to the destination addresses stored in the dependency checking table entries to see if there is a true dependency situation. The destination address of the fabric instruction is compared to both the source addresses and destination addresses in the dependency checking table to see whether there is an output dependency or a reverse dependency situation. Note that in some cases multiple source addresses can be used for the fabric instructions in which case additional comparisons are done. The source address of load instructions are compared against the destination addresses in the dependency checking table. The destination address of store instructions are compared to the source addresses and destination addresses in the dependency checking table. Each of the comparisons shown in FIG. 3 preferably use the associated mask values as described below.

Figure 4A:
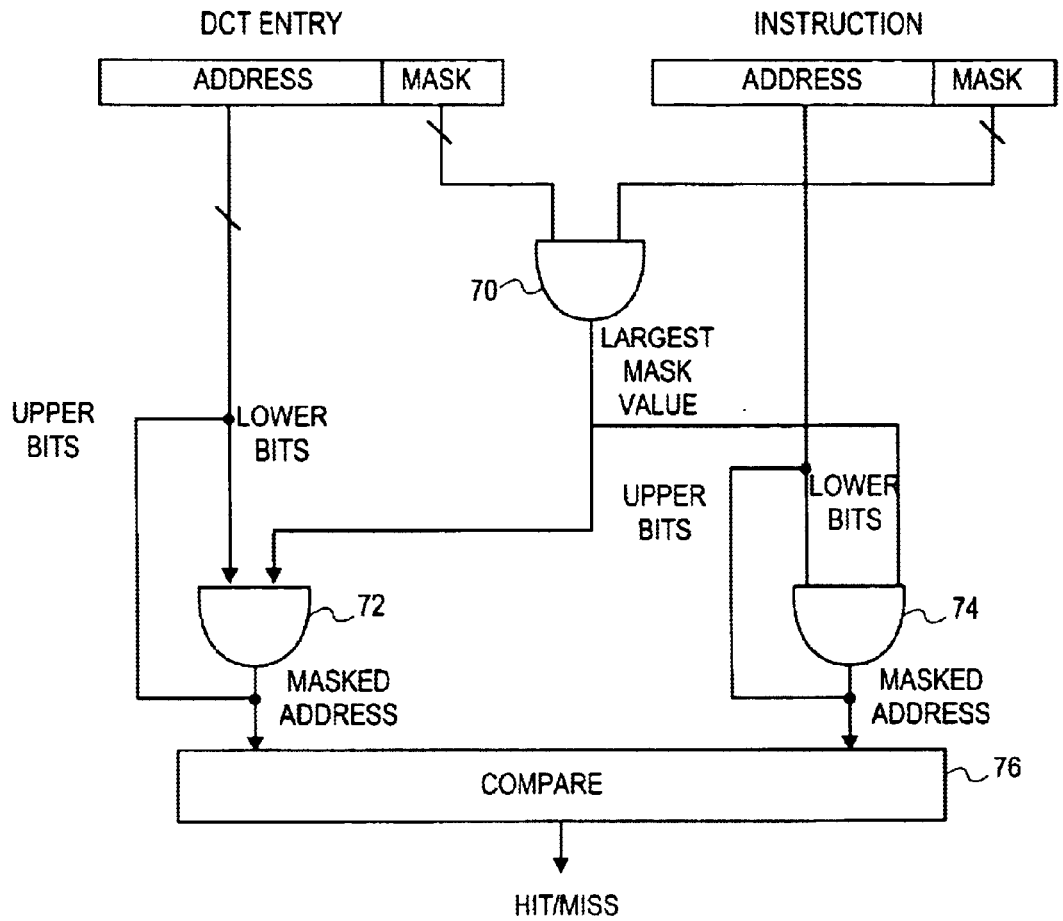
FIG. 4A is a diagram that illustrates one embodiment of a data dependency comparison used with the present invention.

FIG. 4A is a diagram that illustrates details of a single comparator for use with the data checking table. As shown in FIG. 4A, the mask values from the instruction and the data checking table entry are ANDed together to produce a value that indicates the larger of the two masks. The larger of the mask value which is output from the AND 70 is sent to the ANDs 72 and 74. These operate upon the lower bits of the address to produce masked addresses. The masked addresses, both the upper and lower bits, are compared in a comparator 76 to get a hit/miss signal which can be used to stall the CPU. Note that the use of mask values avoids the requirement of using adders and "greater than" comparators which would slow the operation of the comparison.

Figures 4B, 4C:
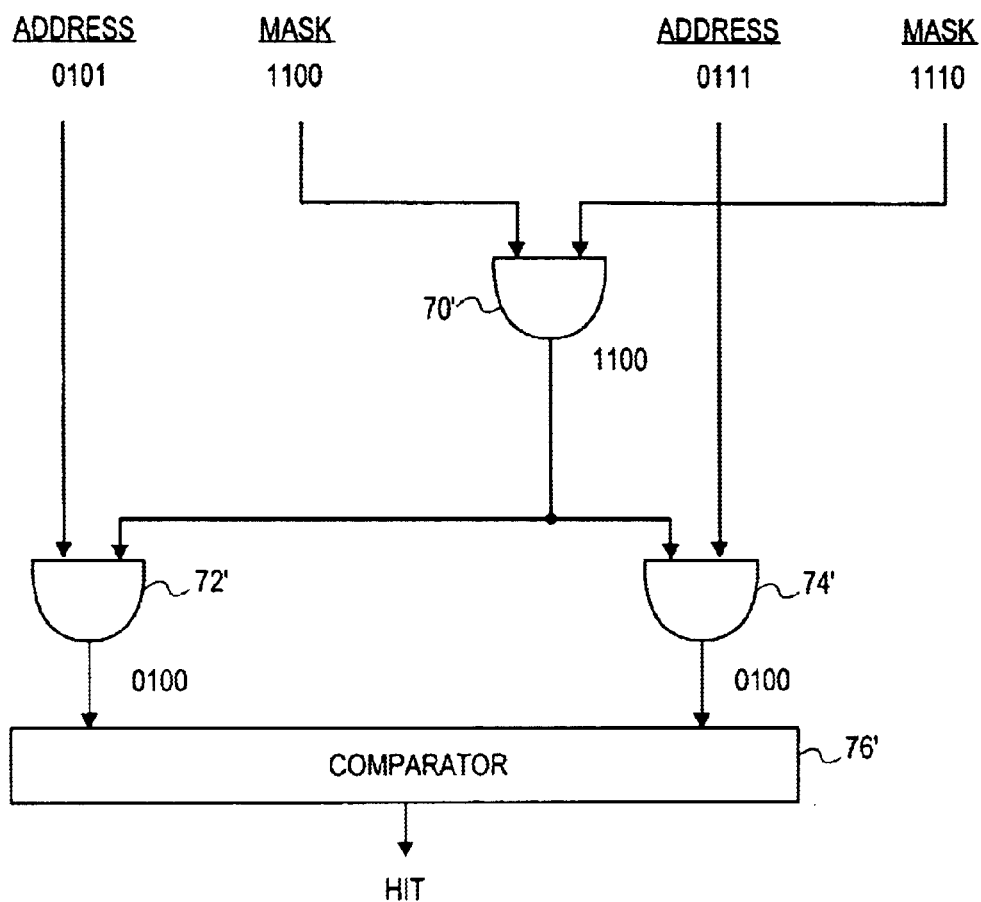
FIG. 4B–C are diagrams that illustrate a simplified example of a data dependency checking.

The operation of the comparator shown in FIG. 4A can be illustrated with the simplified drawing of FIG. 4B. In this simplified drawing of FIG. 4B the mask and address are each illustrated as being 4 bits wide. The two mask values are sent to the AND 70'. This produces the larger of the mask values. The mask "1100" is considered to be larger than "1110", since mask "1100" will mask the lower 2 bits and mask "1110" masks only the lowest bit. The larger mask value is sent to the two ANDs 72' and 74'. The masked address outputs of these two ANDs are the same so that the comparitor 76' indicates a hit. FIG. 4C illustrates the address ranges which are protected by each of the mask values for the example of FIG. 4B.

Looking again at FIG. 4A only the lower bits of the address are compared. In one embodiment ten (10) lower bits are compared to a mask value which is ten (10) bits wide. In some embodiments, the mask value can be constructed from a size indication in the fabric instructions or can be a fixed value for load and storage instructions.

Figure 5:
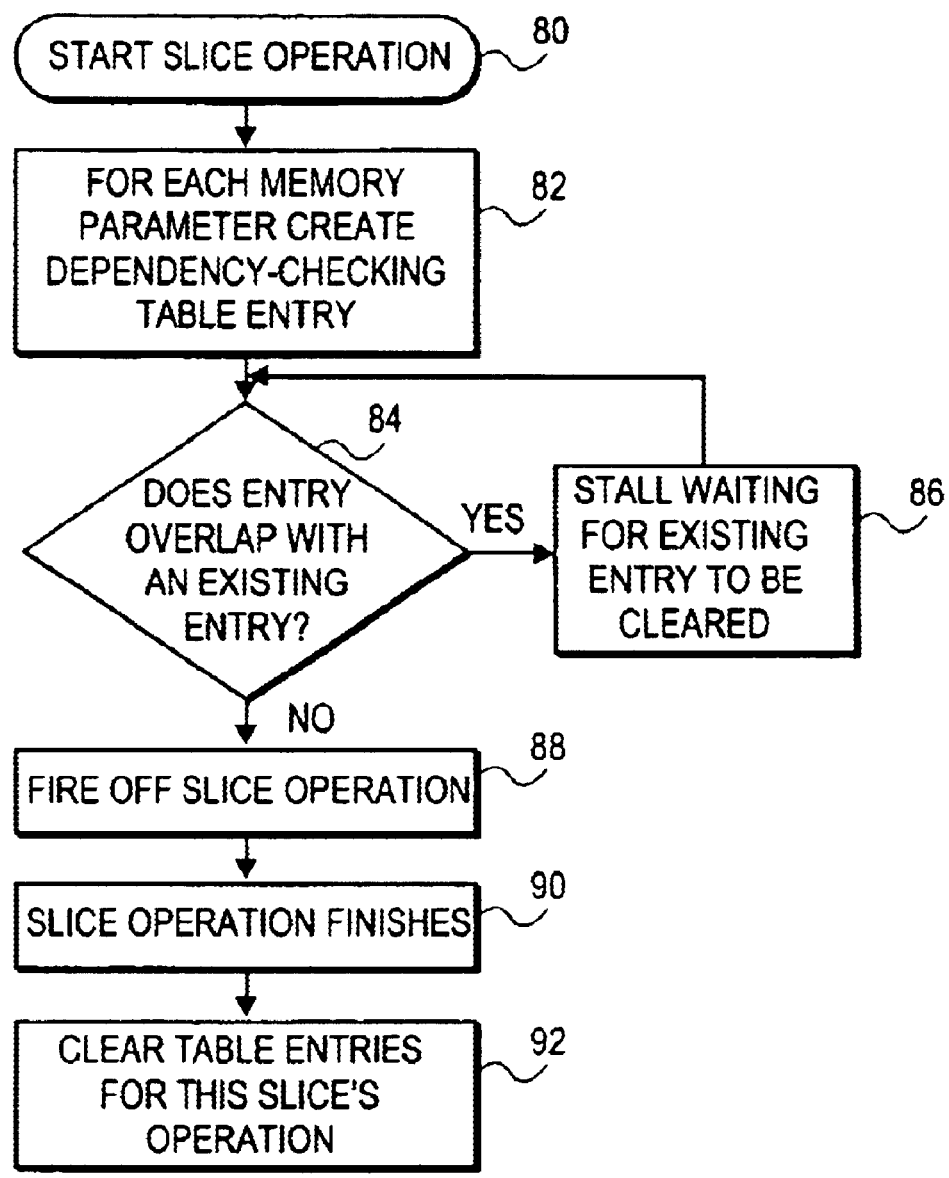
FIG. 5 is a flow chart that illustrates the operation of one embodiment of the present invention.

FIG. 5 is a flow chart that illustrates the operation of a method of the present invention. In step 80, the slice operation begins. In step 82, a dependency checking table entry is created for each memory parameter. In a preferred embodiment, the memory parameter includes a source addresses and a destination address along with corresponding mask values. In step 84, it is checked to see whether the entry overlaps with an existing entry. If yes, in step 86, the system waits for the existing entry to clear. If not, in step 88, the slice operation is sent to the slice in the reconfigurable logic. In step 90, the slice operation finishes and, in step 92, the table entry for this slice operation is cleared from the dependency checking table.

Figure 6:
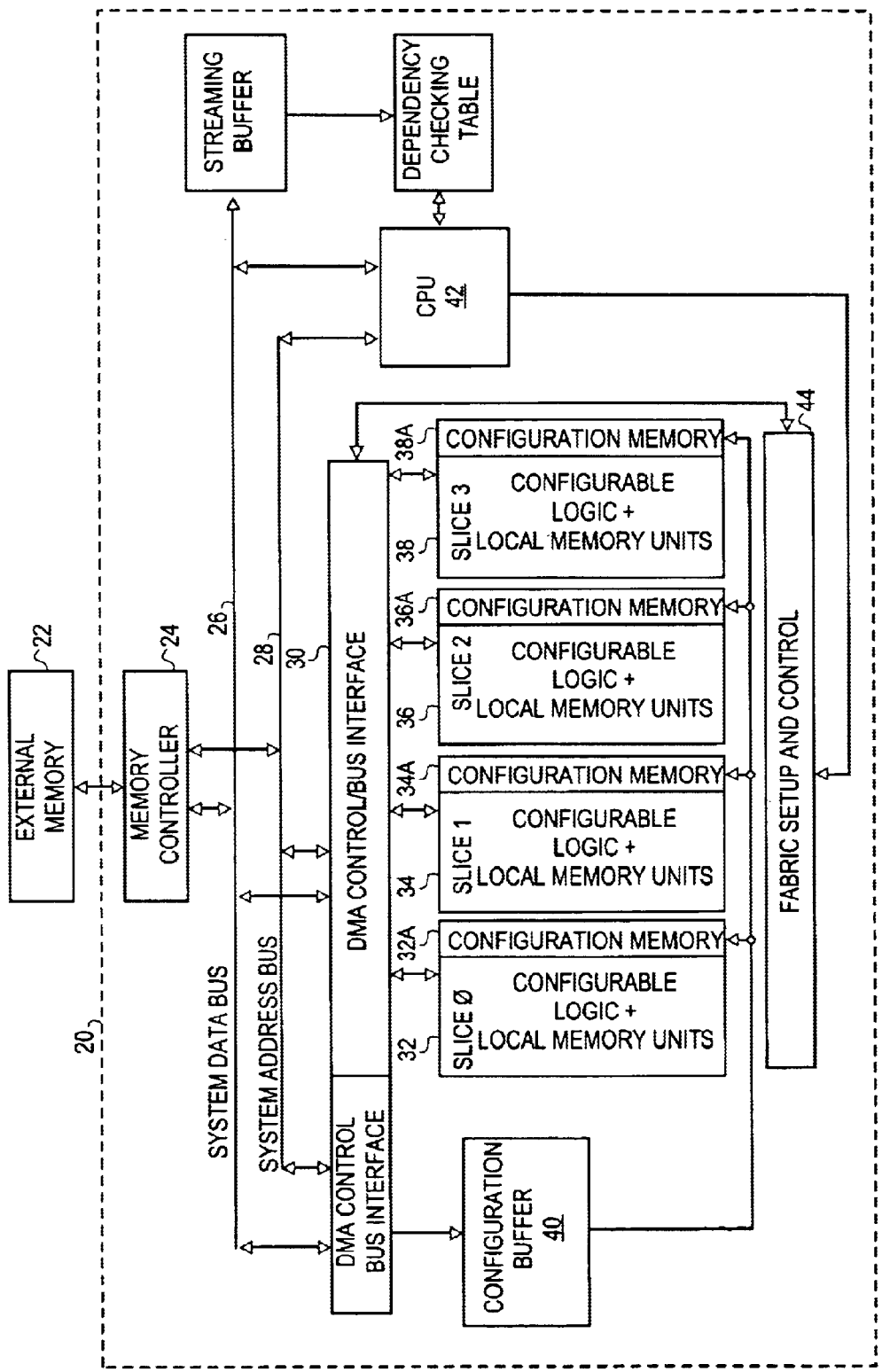
FIG. 6 is a diagram that illustrates the use of the data dependency checking table with a reconfigurable logic including data slices.

FIG. 6 is a diagram which illustrates a reconfigurable chip 20 and external memory 22. The external memory 22 is connected to the memory controller 24. The address and data from the external memory is sent to the system data bus 26 and system address bus 28. These busses are interconnected to a Direct Memory Access (DMA) control/bus interface 30 connected to the local memory units. In the embodiment shown, the local memory units are arranged in slices interleaved with the data path units. Slices 32, 34, 36, and 38 are shown. Each of the slices has a configuration memory 32a, 34a, 36a, and 38a. This configuration memory is loaded from the configuration buffer 40. Also shown in this system, is the central processing unit 42 and the fabric setup and control logic 44. The configuration memory stores the arrangement of configurable logic and the interconnections between the configurable logic and the local memory units. This diagram does not show the input and output to the slices or the interconnection between the data path units of the slices. The connection to the external memory through the DMA control/bus interface allows for the transferring of blocks of data between the external memory and local memory units. Details of the transfer from the local memory units and the external memory is given in the patent application for HIERARCHICAL STORAGE ARCHITECTURE FOR RECONFIGURABLE LOGIC, corresponding to attorney docket No. 032001-011, incorporated herein by reference.

Figure 7:
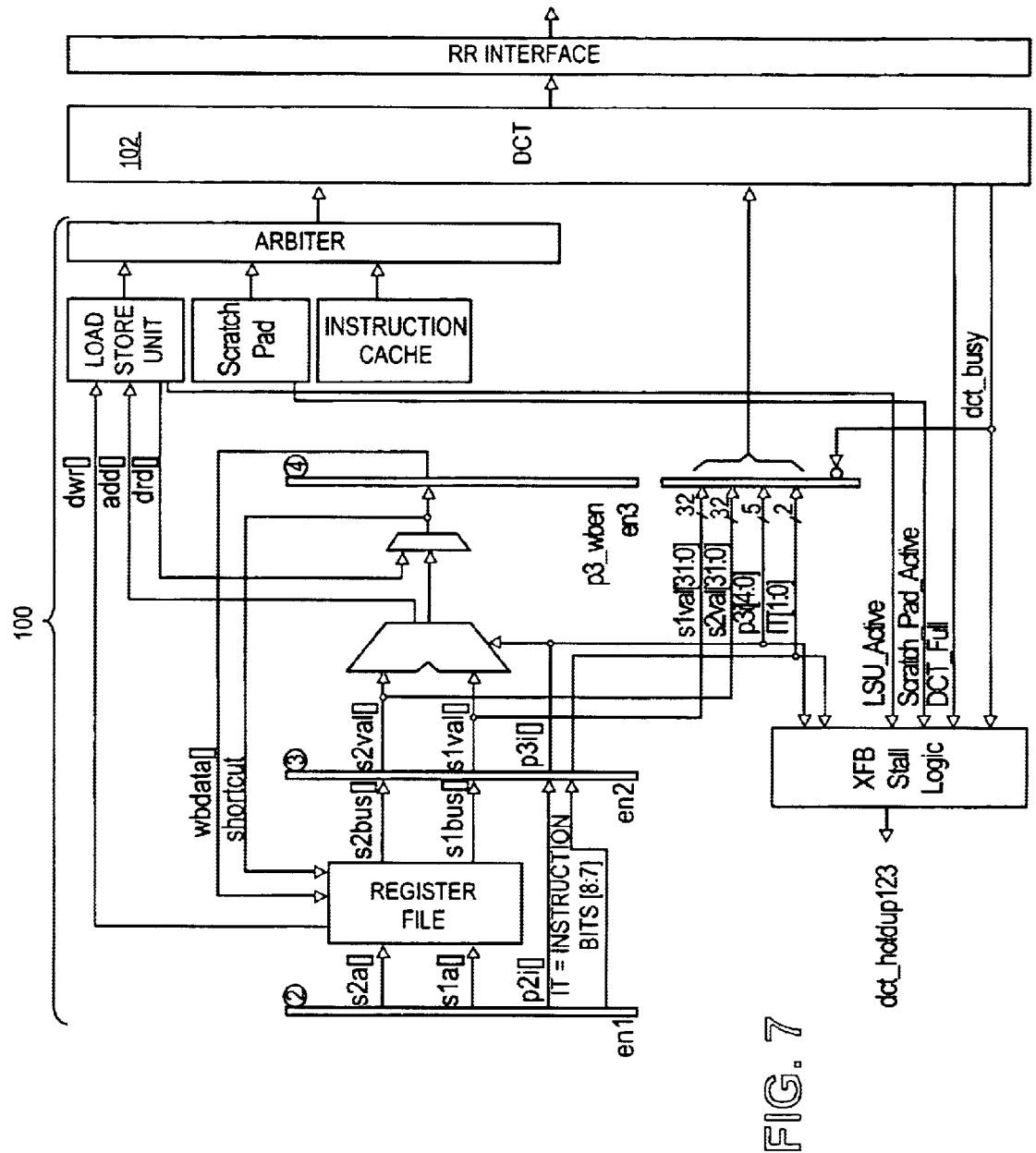
FIG. 7 is a block diagram illustrating some of the details of one embodiment of the interaction between central processing unit and the data dependency checking table.

FIGS. 7–11 illustrate details of one embodiment of the present invention. FIG. 7 shows one embodiment of the single processing unit 100 connected to the dependency checking table 102. In a preferred embodiment, the system uses a number of extension instructions. The extension instruction can use registers to indicate the size and address of the data to be loaded to and from the data slices. A detailed description of the extension instructions are given in the patent application entitled EXTENSION INSTRUCTIONS FOR RECONFIGURABLE LOGIC, corresponding to attorney docket No. 032001-032, incorporated herein by reference.

Examples of the format for the extension instructions is described below. xfb.c loads a slice with a configuration. fxb.2 uses a single source address and a destination address; xfb.3 provides two (2) source addresses and a destination address. Examples of these instructions are given below.

xfb.c r5, 5 load configuration starting at address r5 size=5 Kbit xfb.2 r2,r3 r2[31:7]=source address bits
r2[6:0]=source address size bits
r3[31:7]=destination address bits
r3[6:0]=destination address size bits
xfb.3 r2,r4,r3
r2[31:7]=first source address bits
r2[6:0]=first source address size bits
r4[31:7]=second source address bits
r4[6:0]=second source address size bits
r3[31:7]=destination address bits
r3[6:0]=destination address size bits In the preferred embodiment, the dependency checking table is responsible for enforcing data coherency between the fabric of reconfigurable slices and the central processing unit. The data checking table is a five entry table, with the first four entries used for a coherency scheme between the extension instructions and the load/store instructions, and the fifth entry used strictly for the CPU streaming buffer.

The format for the dependency checking table entry of one embodiment is given in FIG. 8. For each source or destination address, an address field, a mask field, and a validity field is provided. The mask value is computed from the size data as described below with respect to FIG. 9. The actual block size are R [6:0]×128×a size multiplier in bytes. The size multiplier comprises a multiplication by a power of 2 that can be implemented with a shifter to avoid the need for multiplier to calculate the mask. In a preferred embodiment, the size multiplier is a 2 bit field in the extension instructions xfb.2 and xfb.3.

The key in comparing address blocks of different sizes is the use of the ten bit mask. The ten bit mask is stored along with the address bits in the dependency checking table. A zero bit in the mask means that the corresponding bit in the address is masked out. Bit 0 in the mask corresponds to bit 7 in the address.

In one embodiment, the mask of the source and destination address in the extension instruction are derived from the block size as shown in FIG. 9.

To check for extension instruction dependencies, the following comparisons are performed on masked addresses:
1. The source addresses of an extension instruction are compared against the the addresses in all DCT entries. If a match is detected then this instruction has true dependency on an older one.
2. The destination address of the instruction is compared with the source addresses of all DCT entries. If a match is detected, then this instruction has a reverse dependency (or, antidependency) on an older one.
3. The destination address of the instruction is compared with the destination addresses of all DCT entries. If a match is desired, then this instruction has output dependency on an older instruction.

The dependency information is passed to the fabric as follows:
1. The instruction is assigned an instruction ID (IID) equal to the index of the first available entry in the DCT table (config instructions bypass the DCT and don't get assigned an IID). The fabric passes back the same ID when the instruction complete execution on the fabric, the DCT entry is then marked as invalid.
2. The DCT tags the instruction with 4-bit dependency information (DI). Value 0001 in this field means that this instruction is dependent on the instruction with IID=0, value 0101 means that this instruction is dependent on the instructions with IID=0 and IID=2, and so forth.

The DCT table does not stall an extension if it has dependency, rather it tags it with dependency information as explained above and passes it to the fabric. It is up to the fabric to schedule its execution.

Dependency of load or store (LD/ST) instructions is checked in a similar way to extension instructions. The address of LD is applied to the DCT fields as one source address, the destination address and the other source address applied to the DCT are invalid. Similarly, the address of ST is applied to the DCT as a destination address, the source address applied to the DCT are invalid. Note that only bits [31:7] of the LD/ST address is applied to the DCT with mask='h3FF. Unlike extension instructions, if the LD/ST is dependent on an older instruction then the load/store unit is stalled until the dependency is cleared. Also, the LD/ST instruction is not entered in the DCT table.

An extension instruction of type IT=0x2 or LIT=0x3 stalls in stage 3 in the CPU pipe if the following is true:
1. (LSU) load store unit has pending LD/ST,
2. Scratch pad is active,
3. The DCT table is full, or
4. Flag dct_busy is set (i.e., previous extension instruction is held up at the DCT waiting to be sent over roadrunner bus or for a data hazard to clear).

An extension instruction of type IT=0x0 stalls in stage 3 only if the DCT table is full or busy.

FIG. 11 shows a simplified timing diagram to show the stall condition due to data hazard. Note that it assumes that extension instructions and load/store instructions are executed over the roadrunner bus in one cycle (which is not true—see below how flag dct busy is used to stall the pipe until an instruction is executed over the roadrunner bus). This assumption is made to allow to fit consecutive instruction in one table, i.e., for the purpose of explanation, and shouldn't have any implication on how the stall conditions are handled.

In this section, the term coherent memory reference refers to all memory references generated by an extension instruction in the fabric dedicated logic, or requests from the ARC memory arbiter that are originated at either the load/store unit or the scratch pad. All other types of memory requests in the system are considered to be non-coherent.

The dct_busy flag is set when a request from the ARC arbiter (either coherent of non-coherent) or when an extension instruction is being serviced by the DCT. This flag is also set when any of the data hazard flags ld_st_hazard or xfb_hazard is set (more on data hazard flags below). The dct_busy flag causes the lower half of stage 4 of the pipe to stall when set, it also causes the whole pipe to stall if the instruction in stage 3 of the pipe is an extension instruction.

A coherent memory request from the ARC arbiter is acknowledged after the DCT lookup is performed. If no data hazard is detected, the DCT asserts acknowledge, else, if a data hazard is detected then flag ld_st_hazard is set and the acknowledge is held until the hazard is cleared. A non-coherent memory request from the ARC arbiter is always acknowledged in the next cycle (no DCT lookup is performed). Dependency of an extension instruction is checked in stage 4 in the DCT, if a data hazard is detected then flag xjb_hazard is set.

When xjb_hazard is set then flag xjb first is set to 1 if and only if ld_st_hazard is not already set. Similarly, when ld_st_hazard is set then flag xjb first is set to 0 if and only if xjb_hazard is not already set. When xjb_hazard=ld_st_hazard=xfb first=1, then the extension instruction request is looked up in the DCT until it clears. When xfb_hazard=ld_st_hazard=1 and xjb first=0, then the ARC arbiter request is looked up in the DCT until it clears.

When there is a stall condition, the DCT is looked up every time an entry is removed from it (i.e., when an instruction running on the fabric completes). If the DCT lookup coincide with the removal of one entry and the lookup causes a stall, then the DCT is looked up again in the next cycle.

Memory requests from other than load/store unit and scratch pad, such as requests from PCI or JTAG debug interface, are non-coherent. If such requests coincide with an extension instruction at the same cycle at the DCT inputs, then the extension instruction is given the highest priority. Note that requests from load/store unit or scratch pad can never coincide with extension instructions at the DCT inputs.

The DCT control register is mapped to the auxiliary space. It controls both the DCT and the streaming buffer. This register is shown in FIG. 10.

The CPU streaming buffer is a 32-bytes single-entry buffer that is used to cache one memory block in the roadrunner interface. It is designed to minimize LD/ST latency for sequential and local memory references and to reduce traffic on the roadrunner bus. The address of the data block in the streaming buffer is kept in the destination field of the fifth entry in the DCT with mask 1111111110. The source fields in the DCT's fifth entry are always invalid as an initial background condition.

A LD issued by the ARC CPU moves 32-byte block from memory to the streaming buffer in the CPU roadrunner interface. The address of the block is entered in the destination field in the fifth entry in the DCT and marked valid. The address of consequent LD/ST is compared with the destination field of the DCT's fifth entry (this is part of the DCT lookup). If a match is detected then this is a streaming buffer hit. If no match is detected then this is a streaming buffer miss.

If a consequent LD hits in the streaming buffer then the data is returned from the streaming buffer and no roadrunner transaction is generated. If a consequent ST hits in the streaming buffer, then the streaming buffer is written with the ST data (partial write with byte enables into the streaming buffer) and no roadrunner transaction is generated. The streaming buffer is marked dirty after a ST modifies its contents. The streaming buffer dirty flag is kept in the DCT block.

If a consequent LD/ST misses in the streaming buffer then the streaming buffer is invalidated and its content is flushed to memory if and only if it is dirty, else, the streaming buffer is only invalidated. The LD/ST is then allowed to proceed.

If the destination address of an extension instruction hits in the streaming buffer, then the streaming buffer is invalidated and its content is flushed to memory if and only if it is dirty, else, the streaming buffer is only invalidated. If one of the source addresses of an extension instruction hits in the streaming buffer then the streaming buffer should be invalidated and its content flushed to memory if and only if it is dirty, else, no action is needed. The extension instruction is then allowed to proceed.

The LD/ST instructions that use the streaming buffer are the ones that are originated at the load/store unit or at the scratch pad only (LD/ST initiated from PCI for example bypass the DCT and the streaming buffer-no coherency is enforced between PCI and CPU).

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes with come within the meaning and range for equivalent thereof are intended to be embraced herein.

I claim:

1. A reconfigurable chip including:

reconfigurable logic;

a central processing unit, wherein the central processing unit can process certain instructions which result in variably sized data blocks being transferred between the reconfigurable logic and an external memory; and a data dependency table operably connected to the central processing unit to store indications of regions in the external memory associated with the data blocks in order to prevent conflicts with latter instructions.

2. The reconfigurable chip of claim 1, wherein the certain instructions load reconfigurable logic with data from at least one source address in external memory and then load data processed by the reconfigurable logic from reconfigurable logic to a destination address in external memory.

3. The reconfigurable chip of claim 2, wherein the data dependency table stores source and destination addresses of external memory and stores masks.

4. The reconfigurable chip of claim 2, wherein some additional instructions can instruct the reconfigurable logic to operate on the source data in a predetermined manner.

5. The reconfigurable chip of claim 2, wherein the region of the destination location of the external memory is protected from any later instruction that would otherwise read or write data into this region.

6. The reconfigurable chip of claim 2, wherein the region of the source location of the external memory is protected from any later instruction that would otherwise write data into this region.

7. The reconfigurable chip of claim 1, wherein the stored indications includes a start location in external memory.

8. The reconfigurable chip of claim 7, wherein the stored indications includes a mask derived from the size of the variable sized data blocks.

9. The reconfigurable chip of claim 1, wherein a validity bit is associated with the indications.

10. The reconfigurable chip of claim 1, wherein the data dependency table has a number of entries, at least one entry adapted to store at least one start location and at least one mask value, the mask being derived from a size indication.

11. The reconfigurable chip of claim 10, wherein the at least one entry is adapted to store the at least one start source location and a start destination location and associated masks.

12. The reconfigurable chip of claim 10, further comprising circuitry is operatively connected to the data dependency table, the circuitry adapted to stall the operation of certain instructions associated with memory addresses, the circuitry using the mask and the start location in a comparison with the memory location, the use of the mask allowing variable sized regions of a memory to be dependency protected.

13. The reconfigurable chip of claim 12, wherein the source address, destination address and masks are created for each relevant instruction before operating on the instruction.

14. The reconfigurable chip of claim 13, wherein the comparison includes comparing individual mask values to obtain largest mask, masking the relevant addresses with the largest mask and comparing the masked addresses.

15. The reconfigurable chip of claim 1, wherein the reconfigurable logic is divided into a number of slices.

16. The reconfigurable chip of claim 1, wherein the central processing unit is operably connected to a streaming buffer that caches data from the external memory, and wherein the data dependency table contains an entry that indicates the data stored into the streaming buffer.

17. An apparatus comprising:
- a data dependency table, the data dependency table having a number of entries, at least one entry having at least one start location and at least one mask value, the mask being derived from a size indication; and
- circuitry operatively connected to the data dependency table, the circuitry adapted to stall the operation of certain instructions associated with memory address, the circuitry using the mask and the start location in a comparison with the memory address, the use of the mask allowing variable sized regions of a memory to be dependency protected.

18. The apparatus of claim 1, further comprising a central processing unit operably connected to the data dependancy table and reconfigurable logic operably connected to the central processing unit.

19. The apparatus of claim 18, wherein certain cpu instructions load the reconfigurable logic with data from at least one source address in external memory and then load data processed by the reconfigurable logic from reconfigurable logic to a destination address in external memory.

20. The apparatus of claim 19, wherein the circuitry is such that the region of the destination location of the external memory is protected from any later instruction that would otherwise read or write data into this region.

21. The apparatus of claim 19, wherein the circuitry is such that the region of the source location of the external memory is protected from any later instruction that would otherwise write data into this region.

22. The apparatus of claim 19, wherein a validity bits are associated with data stored in the data dependency table.

23. The apparatus of claim 18, wherein the reconfigurable logic is divided into a number of slices.

24. The apparatus of claim 17, wherein the source address, destination address and masks are created for each relevant instruction before operating on the instruction.

25. The apparatus of claim 17, wherein the comparison includes comparing individual mask values to obtain a combined mask value, masking the relevant addresses with the largest mask and comparing the masked addresses.

26. The apparatus of claim 17, wherein the central processing unit is operably connected to a streaming buffer that caches data from the external memory, and wherein the data dependency table contains an entry that indicates the data stored into the streaming buffer.

* * * * *